United States Patent [19]
Wang et al.

[11] Patent Number: 5,837,628
[45] Date of Patent: Nov. 17, 1998

[54] LOW COST AND ENVIRONMENTALLY IMPROVED INFRARED TRANSMITTING GERMANATE GLASSES

[75] Inventors: Jenn-Shing Wang; Moo Chin Wang; Min-Hsiung Hon, all of Tainan, Taiwan

[73] Assignee: National Science Council, Taipei, Taiwan

[21] Appl. No.: 603,346

[22] Filed: Feb. 20, 1996

[51] Int. Cl.$^6$ ............................. C03C 3/23; C03C 3/253
[52] U.S. Cl. ............................... 501/42; 501/43; 501/73; 501/904; 65/32.1; 65/32.5
[58] Field of Search .................. 501/42, 43, 73, 501/904; 65/32.1, 32.5

[56] References Cited

U.S. PATENT DOCUMENTS

| | | | |
|---|---|---|---|
| 3,531,305 | 9/1970 | Dumbaugh et al. | 501/42 |
| 3,745,032 | 7/1973 | Miller et al. | 501/42 |
| 4,385,128 | 5/1983 | Boudot et al. | 501/43 |
| 4,849,002 | 7/1989 | Rapp | 501/43 |

FOREIGN PATENT DOCUMENTS

| | | | |
|---|---|---|---|
| 511764 | 4/1955 | Canada | 501/42 |
| 56-164032 | 12/1981 | Japan . | |

OTHER PUBLICATIONS

Dennis, et al. Germanium XVII. Fused Germanium Dioxide and Some Germanium Glasses, J. Phys. Chem. 30, 1519, 1926.

Murthy, et al., Properties and Structure of Glasses in the System, Phys. Chem. Glasses, 6, 162, 1965.

Urnes, X–Ray Diffraction Studies of Glasses in the System, Phys. Chem. Glasses, 12, 82, 1971.

Sakka, Study on Coordination of Aluminum Ions in Germanate, Borate and phosphate Glasses on the Basis of Alk–X–Ray Flyorescence Spectra, Yogro–Kyokai–Shi, 85, 299, 1977.

Yoshimura, Properties and Structure of Glasses in the System $li_2O$–$B_2O_3$–$GeO_2$, Yogro–Kyokai–Shi, 79, 428, 1977.

Lipinska–Kalita, FT Infrared and Laser Raman Spectroscopy of Amorphous abd Crystalline Germanates, J.Non–Crystal Solids, 119, 41, 1990.

Nielsen, et al., Germanate Glasses: Removal of OH Absorption Bands, A.F.Fray Infrared Physics, 1, 175–186, 1961.

Scholze, Gases and Water in Glass, The Glass Industry, 622, 1966.

Sakuhana, et al., Glassbaboku, 120–122, 1975.

John, et al., Effect of Water Content and Alumina Additions on the Transformation Range Properties of $Na_2O$–$3SiO_2$ Glasses, J. Non–Cryst. Solid, 102,24,1988.

Seiko, et al., OH Absorption in Clap Glass Systems, J. Non–Crtst. Solids, 135, 189–197, 1991.

Chryssikos, et al., A Raman Investigation of Cadmium Borate and Borogermanate Glasses, J. Non–Cryst. Solids, 93, 155–168, 1987.

Oyamada, et al., Optical Absorption Spectra of $Ni^{2+}$ Ions and IR Spectra in $PbO$–$GeO_2$ Glasses Containing $Ga_2O_3$, $As_2O_3$ Or $Sb_2O_3$, J. Non–Cryst. Solids, 112, 282–285, 1989.

Dumbaugh, Infrared Transmitting Germanate Glasses, Emerging Optical Materials, 297, 80–85, 1981.

Riebling, Structure of Molten Oxides. I. Viscosity of $GeO_2$, and Binary Germanates Containing $Li_2O$, $Na_2O$, $K_2O$, and $Rb_2O$, J. Chem. Phys., 39, No.7, 1889–1895, 1963.

Riebling, Structure of Molten Oxides. II. A Density Study of Binary Germanates Containing $Li_2O$, $Na_2O$, $K_2O$, and $Rb_2O$, J. Chem. Phys., 39, No.11, 3022–3030, 1963.

Oyamada, et al., Optical Absorption Spectra of $Ni^{2+}$ Ions and Ir Spectra in $PbO$–$GeO_2$ Glasses Containing $Ga_2O_3$, $As_2O_3$ or $Sb_2O_3$, J. Non–Cryst. Solids, 112, 282–285, 1989.

Lipinska–Kalita, et al., Vibrational Study of Mixed $SiO_2$–$GeO_2$ Glasses, 219, 107–110, 1990.

Lipinska–Kalita, et al., The Structure of Al, Fe, K Silica–Germanate Glasses Investigated by raman and Infrared Spectroscopy, 122, 1–9, 1990.

Kamiya, Coordination of $Ti^{4+}$ Ions in $Na_2O$–$TiO_2$–$GeO_2$ Glasses–an Approach Based on Crystallization Behaviour, X–Ray Absorption and IR Spectroscopy, J. Materials Science 20, 906–916, 1985.

*Primary Examiner*—Karl Group
*Attorney, Agent, or Firm*—Beveridge, DeGrandi, Weilacher & Young, L.L.P.

[57] ABSTRACT

This patent discloses the composition of germanate glass and a new method for its fabrication. The composition comprises germanate, the oxide of an alkali earth group, $Al_2O_3$, ZnO, a halides compound eg. $CaF_2$, $CaCl_2$ and so on,, and can combine with a series of oxygenous compounds such as silicate, borate, phosphate, arsenate, tellurate and so on, if required. The addition of an alkali oxide could increase the glass formation rate and homogeneity, and the defects of devitrification, cord, knot, and blister are reduced. Its fabricated methods which consist of the reduction pressure melting with the addition of a halide and the drying procedure. The germanate glass body that is made is colorless and transparent and it can increase the transmittance of infrared from 20% to greater than 60% in the wave length 2.75–3.0 $\mu$m. The price of producing the germanate glass is decreased and the transmittance of this composition system increased from 5% to 80%.

16 Claims, 10 Drawing Sheets

*FIG. 5* A $GeO_2$ : 54.4, ZnO: 5.1, BaO: 7.5
$Al_2O_3$ : 22.3, CaO:6.7, $Li_2O$: 2.0
melting temp.: 1420 °C
melting time: 1.5hr

FIG. 5B

$GeO_2$: 45.5, ZnO: 4.6, BaO: 13.6, $CaCl_2$: 15.2
$Al_2O_3$: 13.1, CaO: 6.8, $CaF_2$: 1.1 melting temp.: 1380 °C work procedure first: 760 torr, 1380 °C, keep 10-30 min
second: 70 torr, 1380 °C, keep 5 min

FIG. 5 C $GeO_2$: 41.0, ZnO: 5.9, BaO: 9.1
$Al_2O_3$: 22.6, CaO: 13.8, $CaCl_2$: 7.5 melting temp.: 1410–1440 °C

FIG. 5D

GeO$_2$: 40.2, ZnO: 5.7, BaO: 8.9
Al$_2$O$_3$: 21.6, CaO: 13.0, CaCl$_2$: 10.5 melting temp.: 1420 °C

LOW COST AND ENVIRONMENTALLY IMPROVED INFRARED TRANSMITTING GERMANATE GLASSES

FIELD OF THE INVENTION

This invention relates to the composition and fabrication method of germanate glass.

BACKGROUND OF THE INVENTION

The detecting instruments of the infrared transmitting signal are generally used in the aeronautics, astronautics and industrial fields for thermal tracing and thermal detection. The required key part of these kind of detecting instruments is germanate glass material windows which transmit a spectrum range from near infrared to middle infrared, especially useful in the fields of the satellite view window and the guided missile light cap. The germanate glass has rather superior original properties, such as: its Knoop number is 560, it has good electricity insulation that is $10^{13}\Omega$ at 25° C., good anti-corrosion, and high stability. The fabrication process is easier than ceramic especially in optical properties. Its refractive index can be adjusted depending on the requirement, the refraction loss is very low, and the transmittance can reach 83% in the infrared region. Its cut-on wave length in the visible region of the spectrum is lower than 400 nm, while the cut-off wave length of the infrared region is about 7.2 $\mu$m. Due to the germanate glass, superior properties result that consist of the high hardness, adjustable refractive index and high optical transmittance. Therefore, it is suitable to be the raw materials of the infrared ray transmitted windows.

In recent years, countries world wide pay more attention in the fields of the sophisticated astronautic and defensive industries. In the past years, this kind of part that is fabricated with the germanate glass raw material is already used to make the dome of the guided missile in United States. Since it can transmit a spectrum region from near infrared to middle infrared, this kind of glass is used only in the defense industry due to the expensive price. In fact, it can not only provide military uses but also civic use potentially so long as the fabricated cost can be reduced.

In the early years, L. H. Dennis (1926) presented a paper that related to the transparent germanate glass ($GeO_2$)(see J.Phys.Chem. 30, 1519, 1926). However, the germanate glass was not commonly used for civic uses in the past years. The main reason is that the fabricating process of the germanate glass not only needs a high temperature environment but also the raw material reacts easily with water. The glass body contains hydroxyl groups that lead to many defects such as crystal devitrification, cord, or blister and so on. It also easily leads to infrared ray scattering, bad signal transmission, abating the hardness, decreased durability, and even the inability to be used. Hence, M. K. Murthy et al. (Phys. Chem. Glasses, 6, 162, 1965) and S. Urnes et al. (Phys. Chem. Glasses, 12, 82, 1971) proposed a germanate glass which contains the $R_2O$—$Al_2O_3$—$GeO_2$ components. S. Sakka (Yogro-Kyokai-Shi, 85, 299, 1977) and T. Yoshimura proposed a germanate glass which contains the $R_2O$—$Al_2O_3$—$GeO_2$ components (see Yogro-Kyokai-Shi, 79, 428, 1977) and A. Paul (The Am. Ceram. Soc., Inc. Columbus, Ohio, 1985) presented a germanate glass which contains the TO—$M_2O_3$—$GeO_2$ components, in addition, K. E. Lipinska-Kalita et al. (J. Non-crystal solids, 119, 41, 1990) presented a germanate glass which contains the $R_2O$—$Al_2O_3$—$SiO_2$—$GeO_2$ components. Nevertheless, most of these germanate glasses were classified as academic exploration; nobody proposed the practicability of this study.

The main reason these materials were not studied is that to fabricate the germanate glass windows with the performance of infrared transmission, the following problems must be overcome:

(1). Easily occurring defects: The stability of the germanate glass is not as good as the silicate glass; in the process of fabricating and forming, the devitrification phenomena occurs easily. The germanate glass obviously cuts down the infrared transmittance to less than 10% due to the exhibiting of cord and blister. The signal transmission intensity is significantly influenced resulting in it being unable to be used.

(2). The cost of raw materials is high: the unit price of the raw material is high and reduces the competition in the glass market. For example, the price for $GeO_2$ for the germanate glass is NT$20 thousand per Kg.

(3). The preparing temperature is high: In general, the preparing temperature of the germanate glass is almost higher than 1400° C. even over 1550° C. Therefore, melting the raw materials not only consumes a great deal of the energy, but also an appropriate device is required to keep the materials at so high a temperature state.

In fact, the commercial products of the germanate glass is rare, at present time, consist of merely the Corning species. The Corning 9754 glass product that contains $R_2O$—$Al_2O_3$—$GeO_2$ components, U.S. Pat. No. 4,849,002, and is used in missile domes. It is not commonly used yet due to its fabricating cost and its high temperatures.

In the process for fabricating germanate glass, the raw materials can react easily with a water molecule that exists (1). in the ambient, (2). on the surface of raw material powder, (3). in the lattice as crystal water, (4). in the structure of the furnace body and so on. The water molecules are mixed into the fused glass liquid and resides in the network structure. The content of the hydroxyl groups in the glass will be different depending on the different melting conditions. However, water molecules are mixed into germanate glass resulting in the existence of hydroxyl groups in the glass body and cause a stronger absorption in the range between 2.75 to 2.90 $\mu$m. Thus, the signal transmission of the germanate glass is affected in the range between 3.0 to 4.0 $\mu$m, and even leads to the germanate glass be disabled and the chemical durability of glass to be bad.

Therefore, numerous experts and scholars proposed a method to eliminate the hydroxyl groups from the germanate glass body; S. Nielsen et al. (A. F. Fray Infrared Physics, 1, 21, 1961) attempted to stir the melting glass liquid under dry conditions or to add a halide that can promote the elimination of the hydroxyl groups. In addition, Host Scholze (The Glass Industry, 622, 1966) illustrated five methods for the hydroxyl group elimination from the germanate glass:

(1). In order to decrease the partial pressure of the water and reduce the mixed quantity of the hydroxyl groups, the raw material of glass is melted under dry conditions. For example, the fabricated germanate glass contains 0.48% hydroxyl groups when melting raw material under the saturated vapor, but it contains 0.04–0.08% hydroxyl groups when the raw material was melted under the saturated vapor with 10–12% water. In addition, drying the furnace body and raw material can also reduce the mixed quantity of hydroxyl groups.

(2). The mixed quantity of the hydroxyl groups in the melting process for preparing the germanate glass under vacuum with 10 mmHg is lower than that under general dry conditions. Nevertheless, preceding the melting operation under the high temperature and low pressure condition, the rapid decomposition and boiling phenomena of the raw materials occur easily and will lose a quantity of the germanate glass. Generally, the loss quantity is less than 1% when keeping the high temperature for 30 minutes, but, will be 2–4% when keeping the high temperature for 60 minutes.

(3). By conducting a dry gas into the melting glass liquid or adding a foaming agent to the glass liquid, the stirring action in the glass liquid will increase and the mixed hydroxyl groups will be eliminated. Here, the raw material of the foaming agent is carbonate which can be decomposed under 700°–1000° C. and it will assist in stirring the glass liquid.

(4). The reaction following the addition of a halide into the melting glass liquid will eliminate the hydroxyl groups from the glass liquid. This halide is represented by $MX_2$, such as $MF_2$, $MCl_2$, $MBr_2$, or $MI_2$.

$$Ge-O-H + MX_2 \rightarrow Ge-X + MO + HX(g) \uparrow$$

(5). Reducing the viscosity of the glass liquid by increasing the system temperature, or accelerating the stirring by thermal convection or by conducting the gas into glass liquid, and by diffusion helps the deviation of the hydroxyl groups.

Sakuhana et al. (Glassbaboku, 120–122, 1975) depicted that blowing a drying gas into a melting glass liquid directly can promote the speed of hydroxyl group elimination in the glass body; M. John et al. (J.Non-cryst.Solid, 102, 24, 1988) proposed a melting method that proceeded under the drying condition with a −70 dew point.

Recently, in the germanate glass fabrication process, the methods for eliminating the hydroxyl group from the glass body include the reaction of the halide and the melting glass liquid. On the one hand, the added halide has to react with the melting glass liquid, and the product gas, HX, is vaporized easily under the melting temperature, so, the addition quantity of this halide should be increased in the process. On the other hand, the product gas, HX, corrodes the furnace body easily and causes damage to the heating facility, hence, the addition quantity must be reduced. The addition of floride produces hydrofluoric acid gas that corrodes the furnace body and causes damage that still occurs and leads to the increasing hardness of the germanate glass. For example, the U.S. Pat. No. 3,531,271 proposed a method for using a halide that eliminated the hydroxyl group during the reaction. Due to the gas product, hydrochloride has a strong reactivity, the fireproofed brick needs to be treated especially, but the collecting gas facility is required to be furnished. Therefore, this method is only adopted occasionally. Because the source of hydroxyl groups is numerous, the methods can not be controlled in a specified way, so, the efficiency of this elimination method is suspect.

SUMMARY OF THE INVENTION

An object of the invention is related to a composition which comprises germanate, the oxide of an alkali earth group, $Al_2O_3$, ZnO, a halides compound e.g. $CaF_2$, $CaCl_2$ and so on, and which can combine with a series of oxygenous compounds such as silicate, borate, phosphate, arsenate, tellurate and so on, if required.

An other object of the invention is related to methods of fabrication which consist of reduction pressure melting with an addition of halide, and a drying procedure.

BRIEF DESCRIPTION OF THE DRAWINGS

Table 1. The influence of the treatment modes on germanate glass vs. the content of hydroxyl groups in present invention.

Case A
  Raw material: $CaCl_2$—CaO—BaO—ZnO—$Al_2O_3$—$GeO_2$
  compounds Ratio: 7.5-13.8-9.1-5.9-22.6-41.0
Case B
  Raw material: $CaCl_2$—CaO—BaO—ZnO—$Al_2O_3$—$GeO_2$
  compounds Ratio: 10.5-13.0-8.9-5.7-21.6-40.2
Case C
  Raw material: $CaF_2$—$CaCl_2$—CaO—BaO—ZnO—$Al_2O_3$—$GeO_2$
  compounds Ratio: 1.1-15.2-6.8-13.6-4.6-13.1-45.5

Raw material: $Li_2O$—CaO—BaO—ZnO—$Al_2O_3$—$GeO_2$
compounds ratio: 2.0-6.7-7.5-5.1-22.3-54.4
The mixture was treated under vacuum conditions and 1420° C. melting for 90 minutes.

Raw material: $CaF_2$—$CaCl_2$—CaO—BaO—ZnO—$Al_2O_3$—$GeO_2$
compounds ratio: 1.1-15.2-6.8-13.6-4.6-13.1-45.5
In the meantime, halide was added into the mixture and treated under vacuum conditions. The treatment process was divided into two stages:
  (1). melting the mixture under the condition of 1380° C. and 760 torr and keeping for 30 minutes.
  (2). melting the mixture under the condition of 1380° C. and 70 torr and keeping for 5 minutes.

Raw material: $CaCl_2$—CaO—BaO—ZnO—$Al_2O_3$—$GeO_2$
compounds ratio: 7.5-13.8-9.1-5.9-22.6-41.0
In the meantime, the halide was added into the mixture and was melted under the condition that the temperature is between 1410° C. and 1440° C.

Raw material: $CaCl_2$—CaO—BaO—ZnO—$Al_2O_3$—$GeO_2$
compounds ratio: 10.5-13.8-8.9-5.7-21.6-40.2
In the meantime, the halide was added into the mixture and was melted under the temperature condition of 1420° C.

DETAILED DESCRIPTION OF THE PREFERRED EMBODIMENTS

In this present invention, in order to solve the bottlenecks mentioned above, a fabricating method which can reduce the mixed quantity of hydroxyl groups and avoid the damage occurring in the melting device due to the addition of the halide is proposed. Herein, the key point in this process is that the addition of the oxide of an alkali metal species could increase the glass formation rate and homogeneity, and eliminate the defects of devitrification, cord, knot, blister etc., so that the obtained germanate glass is colorless and transparent.

Certain of the starting material of the invention can be germanate, the oxide of an alkaline earth group, $Al_2O_3$, ZnO, halides compound, and can combine with a series of oxygenous compounds such as silicate, borate, phosphate, arsenate, tellurate and so on, if required. The major components of the germanate glass are germanate, $Al_2O_3$, CaO, BaO, and ZnO. The combination of germanate glass that is prepared has 35–65% germanate by weight as the major part, and has 40–55.5% as an optimal ratio. The usual dosage percent of $Al_2O_3$ is 10–25% by weight, and 12.5–23% is optimal. The usual dosage percent of ZnO is 3–8% by weight, and 4–6% is optimal. The usual dosage percent of BaO is 6–15%, and 7.1–14.0% is optimal. The usual dosage percent of CaO is 5–15%, and 6–14.0% is optimal. This composition can combine $SiO_2$ if required, to prepare some different glasses such as silicate, borate, phosphate, and so on.

Figure 1:
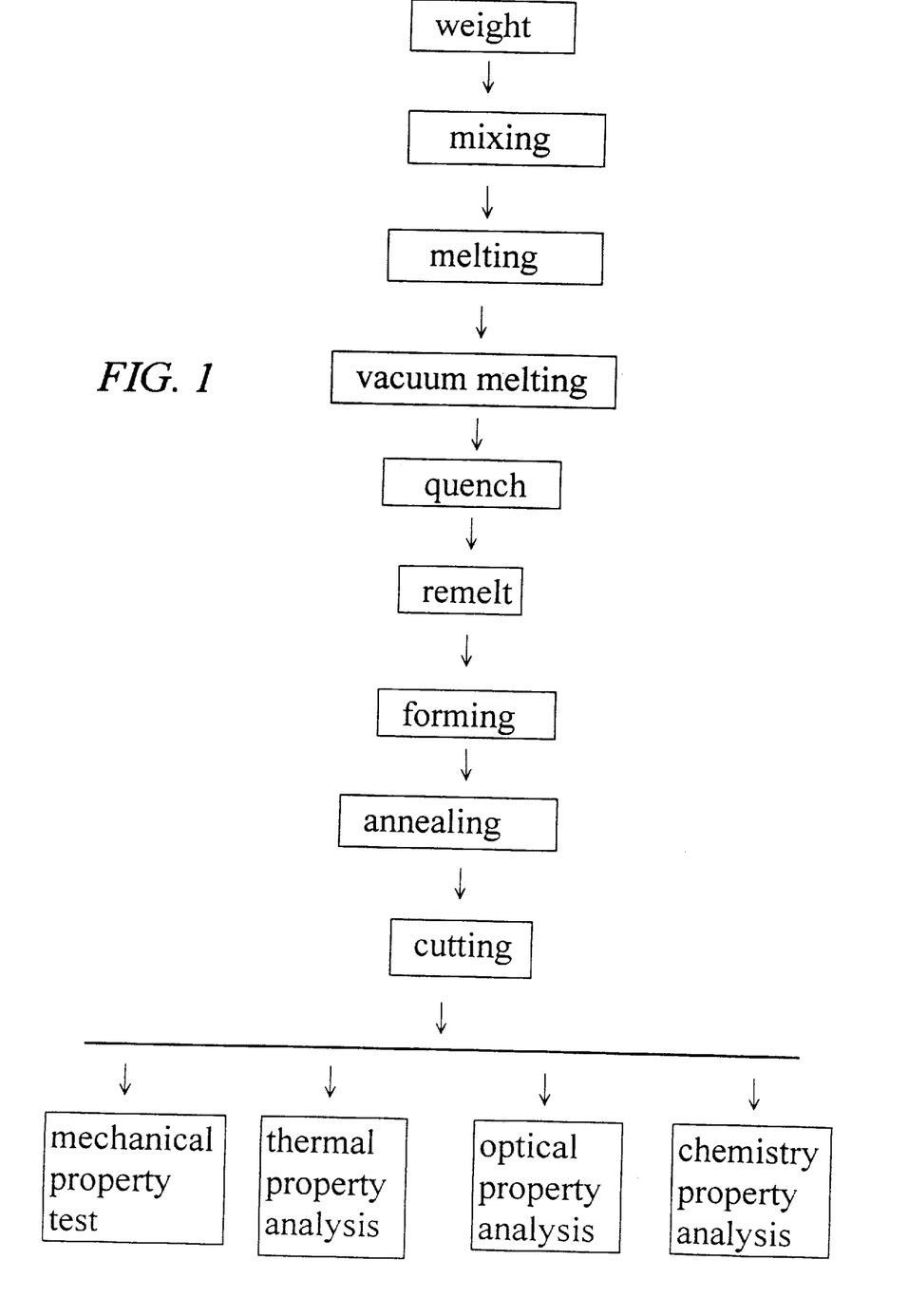
FIG. 1. The fabrication process flow diagram of this invention.

Besides the process as mentioned above, the composition and fabrication methods of the germanate glass of the present invention also includes a reducing pressure melting process. The proposed method is to match the addition of the halide process, wherein the reducing pressure also functions to dehumify as shown in FIG. 1. The reducing functions to dehumify as shown in FIG. 1. The reducing pressure, such as suction, functions by adjusting the valve opening to control the vacuum degree in the furnace. That is to say a treatment procedure that the extraction operation reduces the inside pressure of the furnace from one atm (760 torr) to a lower pressure. Wherein, the reducing pressure melting that has the sequence of reducing pressure can be divided into three stages: before fusion, during the reaction of fusion, and after fused. Using the extracting gas method separately in different stages reduces the inside pressure of the furnace.

In this invention, the composition of germanate glass, comprises the halides compounds, and one member selected from at least one of the alkali metal group or alkaline earth group. When more than two kinds of halides are comprised in the composition of germanate glass, the same halides or the different halides can be selected. In general, the halides of calcium metal is most suitable, such as the addition of a quantity of calcium chloride, calcium floride, calcium bromide, calcium iodide that are all less than 25% by weight. For example, the content of calcium chloride is about 1.0–17.0%, and 2–16.0% by weight is optimal, the content of calcium floride is less than 3.0% by weight but optimal value is less than 2.0%. If calcium chloride and calcium floride were added at same time, the content of these two components is less than 22.0% and the suitable content is 11.0–16.0%.

In this invention, the proposed reducing pressure melting method is to store the raw material that is mixed with the halides in a high pressure furnace (1–10 atm.), using the extraction pump or adjusting the valve opening to keep the required pressure between 1.0 to 740.0 torr. The whole preparing process can be completed by the following steps:

(1). heating the furnace temperature up to 1200° C. and then heating up continuously to 1300°–1500° C.;

(2). depositing the platinum crucible that contains the fully mixed raw materials into the furnace;

(3). melting the raw material for 20–300 minutes and then closing the extraction valve and ceasing extraction;

(4). conducting the dry nitrogen gas with 0.5 liter/min. into the furnace until the temperature is reduced to ambient; and (5). opening the door of the furnace and taking the crucible out, dumping out the sample formed.

Figure 2A:
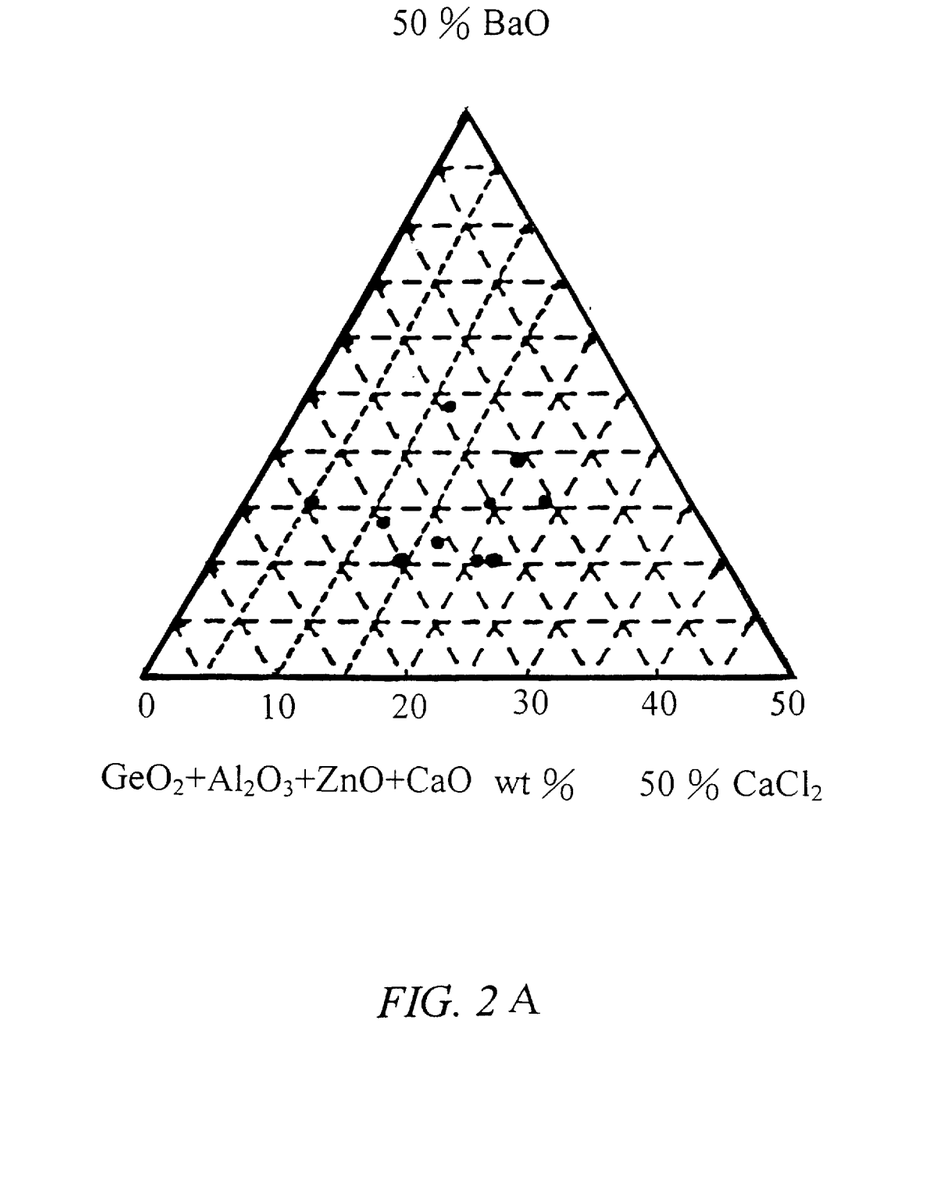
FIG. 2. The partial vitrify extent of the obtained germanate glass in this invention.
Figure 2B:
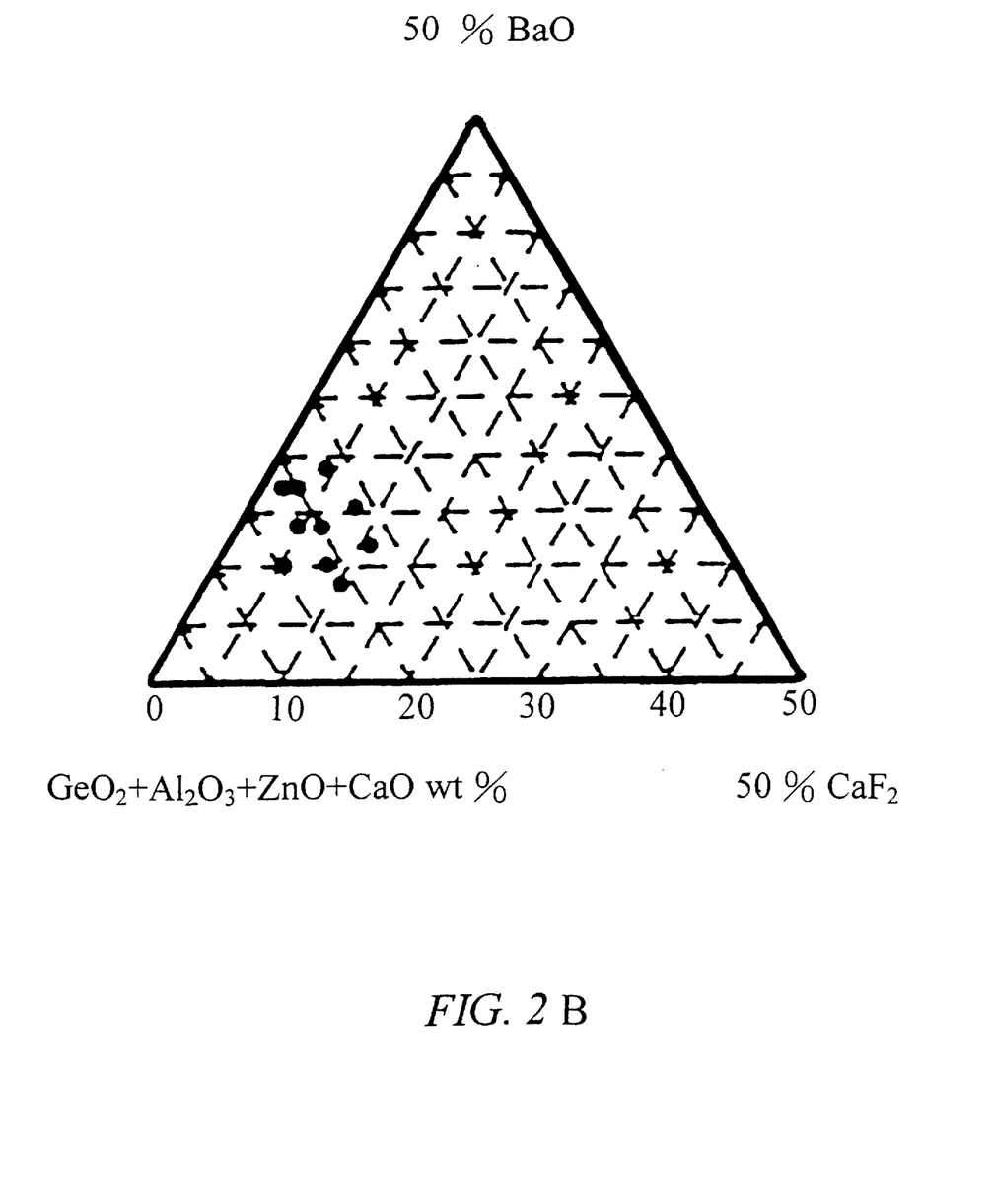
Figure 2C:
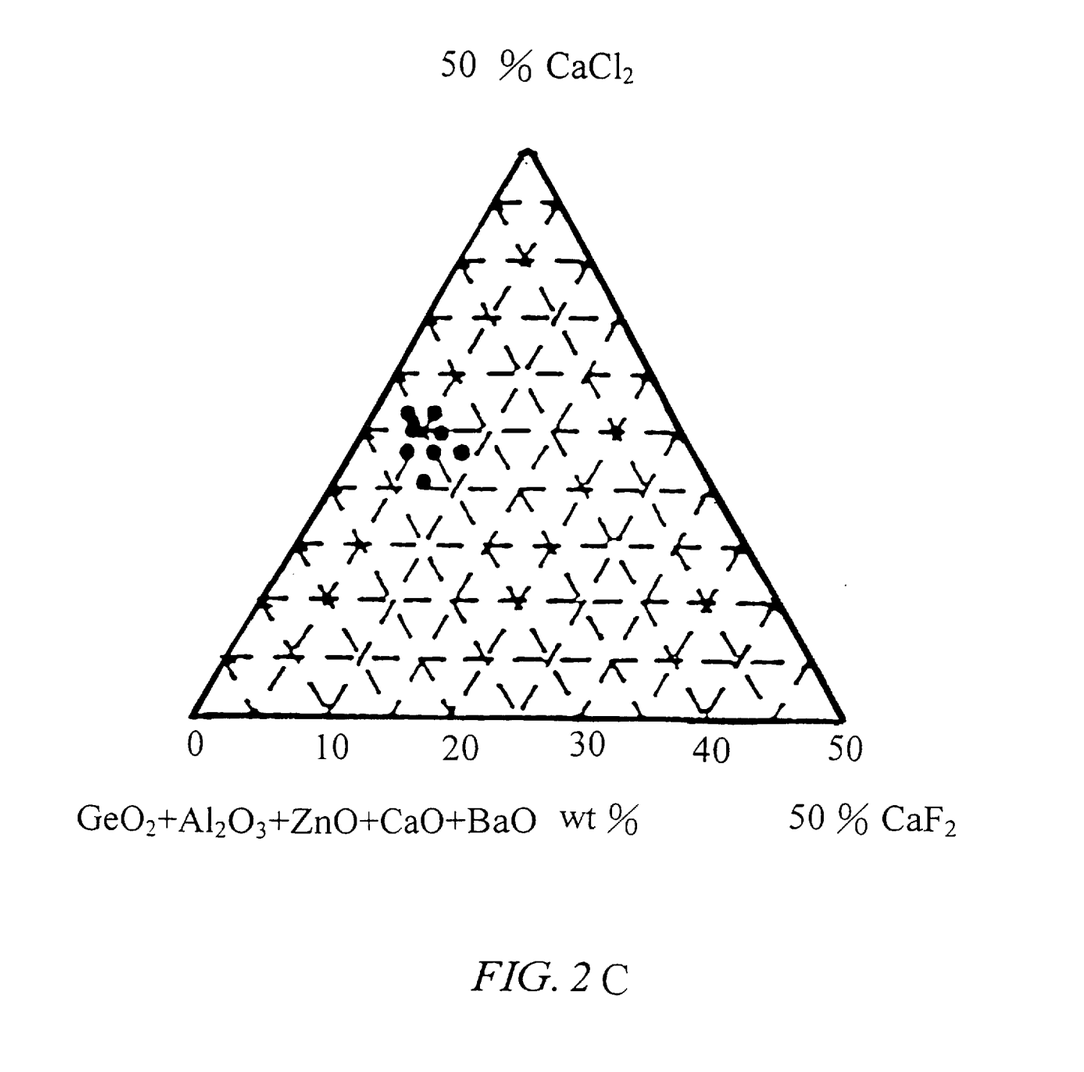

To carry out the proposed method of this invention, the following factors should be taken into account. First, according to the specified composition ratio, the raw materials were prepared to be the vitrifiable extent, and the adopted materials include germanate, the oxide of an alkali metal species, $Al_2O_3$, and ZnO. On the basis of system need, this process can incorporate the other compound species containing oxygen such as silicate, borate, phosphate, and so on. The result is shown in FIG. 2. Second, in accordance with the addition quantity of halides, the corresponding temperature and time for melting the raw material are selected. One of the following ways, under the low operation pressure state, increasing the temperature in the furnace and extending the melting time will lead to the effect of decreasing the mixed quantity of hydroxyl groups in glass product.

In this invention, the compositions and the fabrication method is not only more suitable to be used in preparing the germanate glass than the well-known methods, but also in the first stage of this process, the mixture is melted for 30 minutes at 1380° C. and 760 torr; in the second stage, the mixture is melted for 5 minutes at conditions of 1380° C. and 70 torr. In the high pressure furnace described above, besides the common electricity that is used, other appropriate methods can be used also for melting the glass raw materials, for example, heating the raw material with a crucible furnace, high frequency heating and the other heating methods that use solid, gas or liquid fuels. These methods all can produce a clear germanate glass with no defects.

In this invention, the proposed method elucidates that the reducing pressure melting pairing with the addition process of halides, this method can be carried out with a drying procedure depending on need in addition to those methods mentioned above. All process diagrams are shown in FIG. 1. wherein this drying procedure is implemented separately in two stages: under fusion and during the reaction of fusion. It can be described as following:

(a.) the drying procedure under fusion consists of calcining the raw material powder, preparing the composition of the glass compound within the drying case and replacing the oxide with carbonate in the drying process of the furnace body.

(b.) the drying procedure during the melting reaction includes conducting the dried gas into the glass liquid melt, using a foaming agent, and using a high temperature diffusion method to cause the drying operation to release the hydroxyl groups in the glass liquid.

Figure 3:
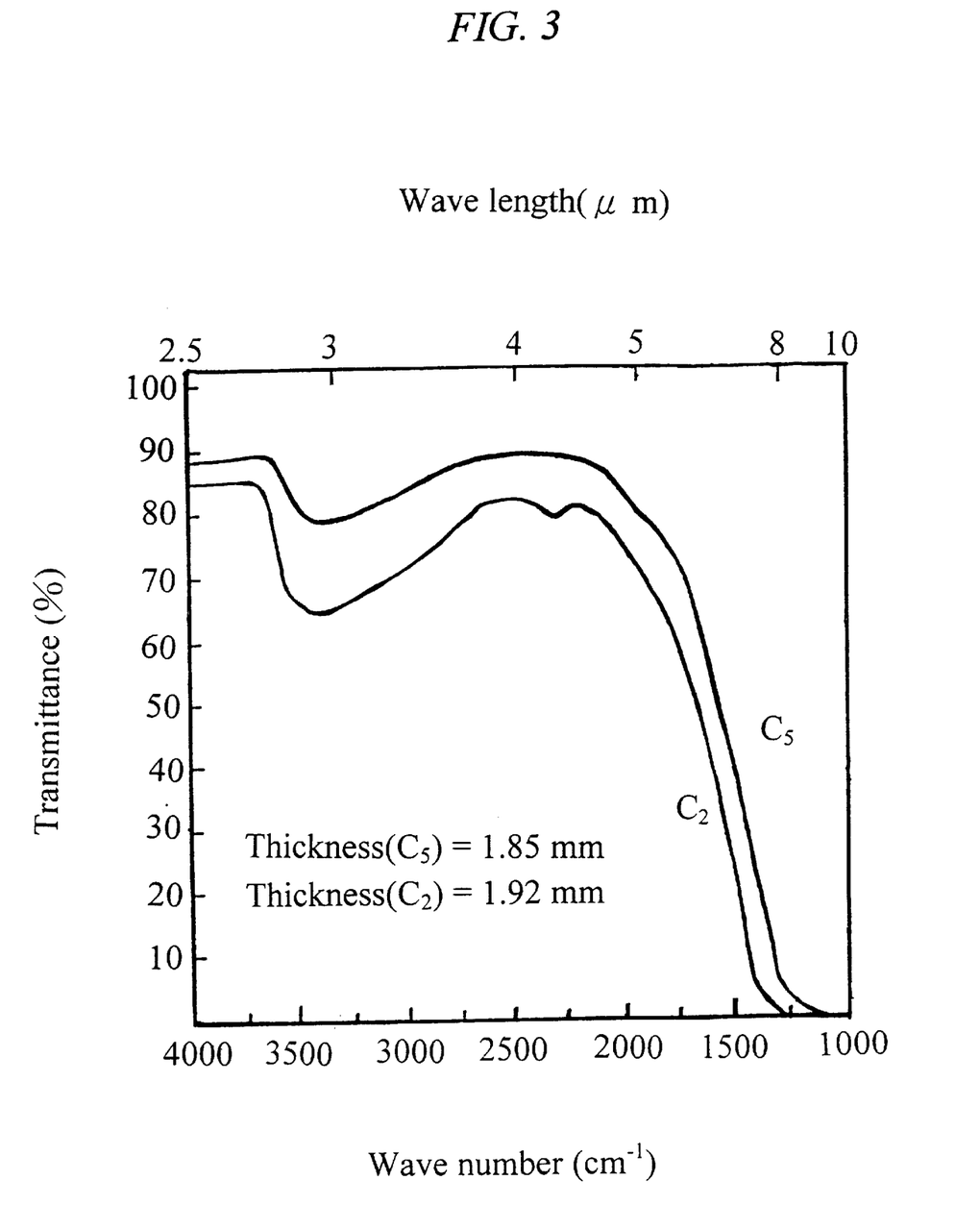
FIG. 3. The infrared transmitting curve of the germanate glass in the present invention, the specimen thickness is 2 mm and the tested wave length is 2.5–10 μm.
Figure 4:
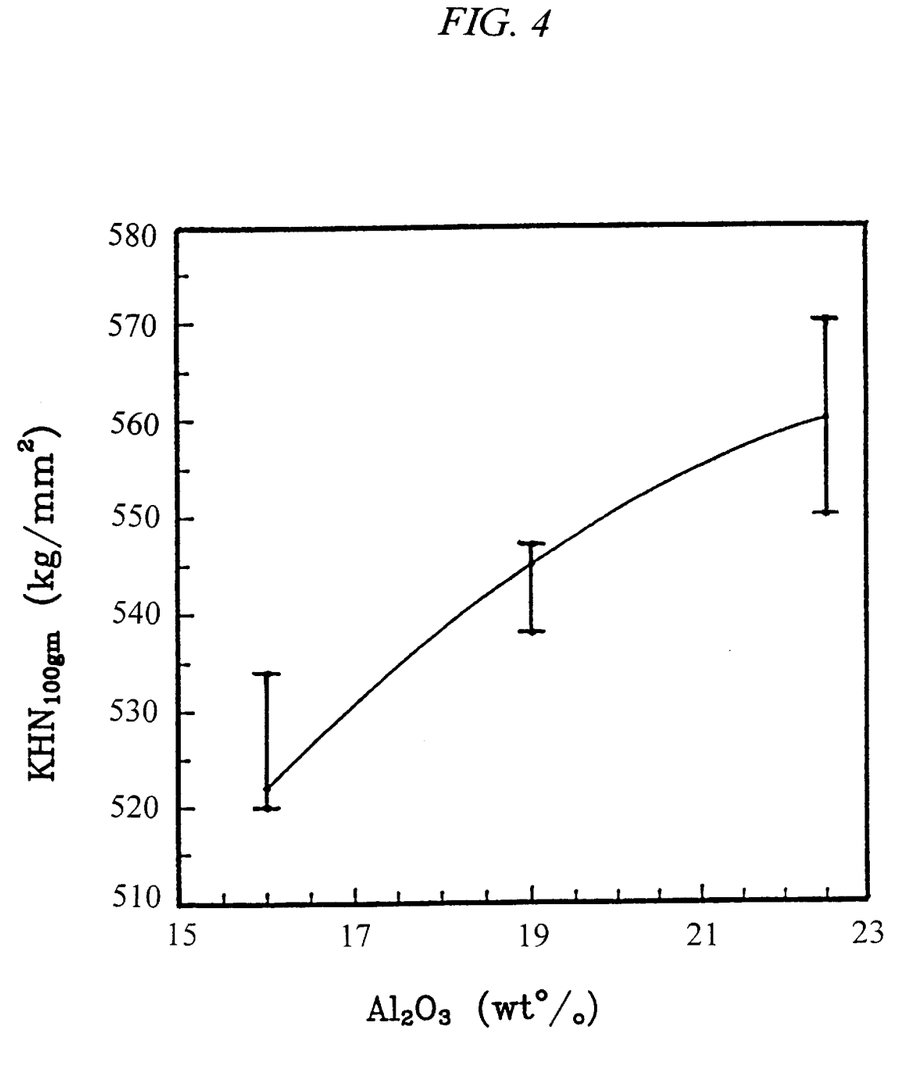
FIG. 4. The curve of the Knoop (100 mg) Numbers vs. the content of the aluminum oxide in the obtained germanate glass in the present invention.

In this invention, the obtained glass body is made of a specimen that is 2 mm thick after the cutting, grinding, and polishing operations. The specimen is used to evaluate the infrared transmittance under the 2.5–10 µm wave length spectrum test. FIG. 3 indicates the infrared transmitted curve. FIG. 4. indicates the relation curve of the Knoop (100 g) Numbers vs. the content of the aluminum oxide in the obtained germanate glass in the present invention. However, the hydroxyl group content in this germanate glass is influenced by the operation variables, so, defining the Parameter, $B_{OH} = (1/t) * \log (T_{2.6}/T_{2.9})$ $T_{2.6}$ and $T_{2.9}$ represent the transmittance at 2.6 µm and 2.9 µm respectively. The result is shown in FIG. 5.

Figure 5A:
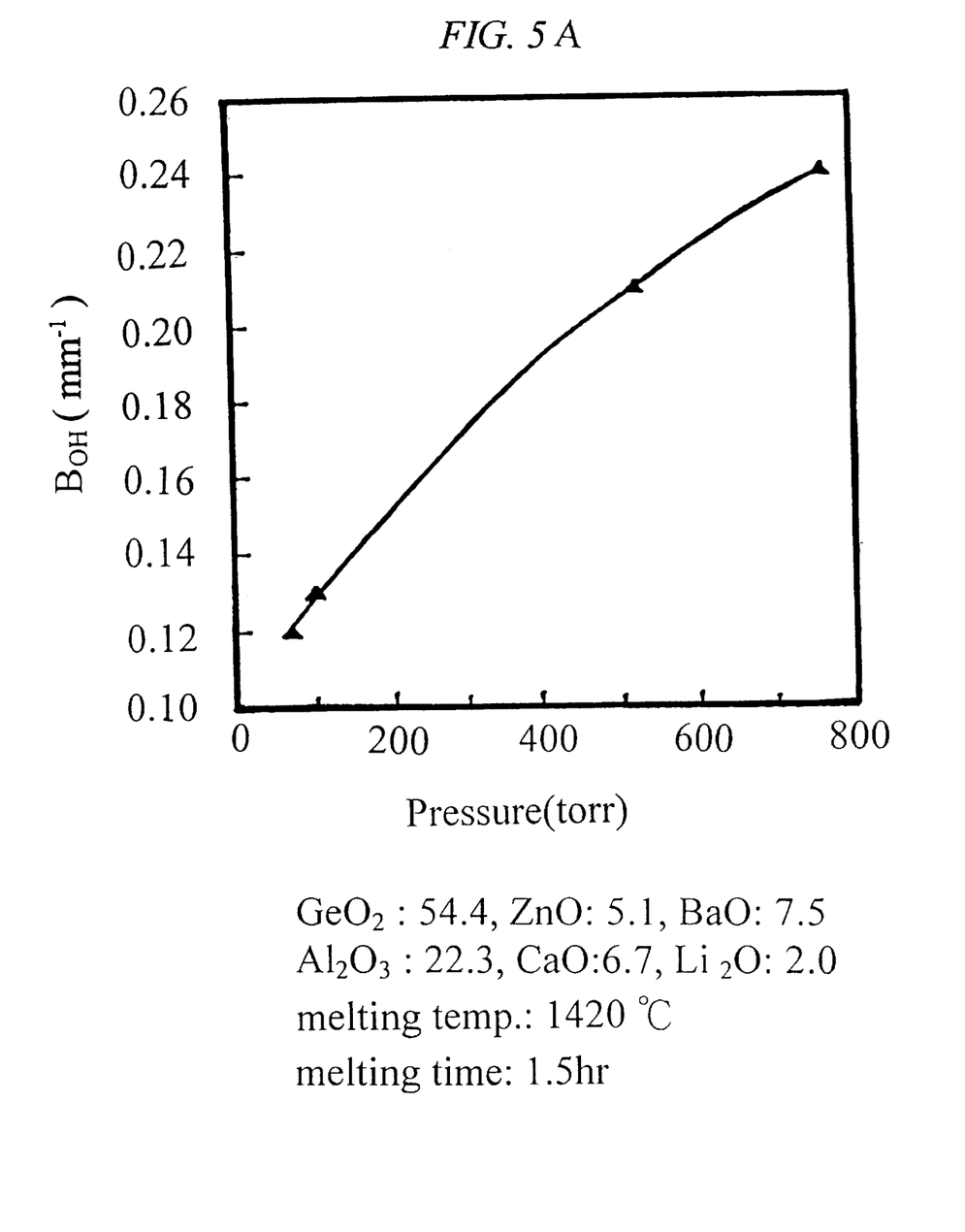
FIG. 5A. The influence of the operating variables vs. the content of the hydroxyl groups in the obtained germanate glass in the present invention.
Figure 5B:
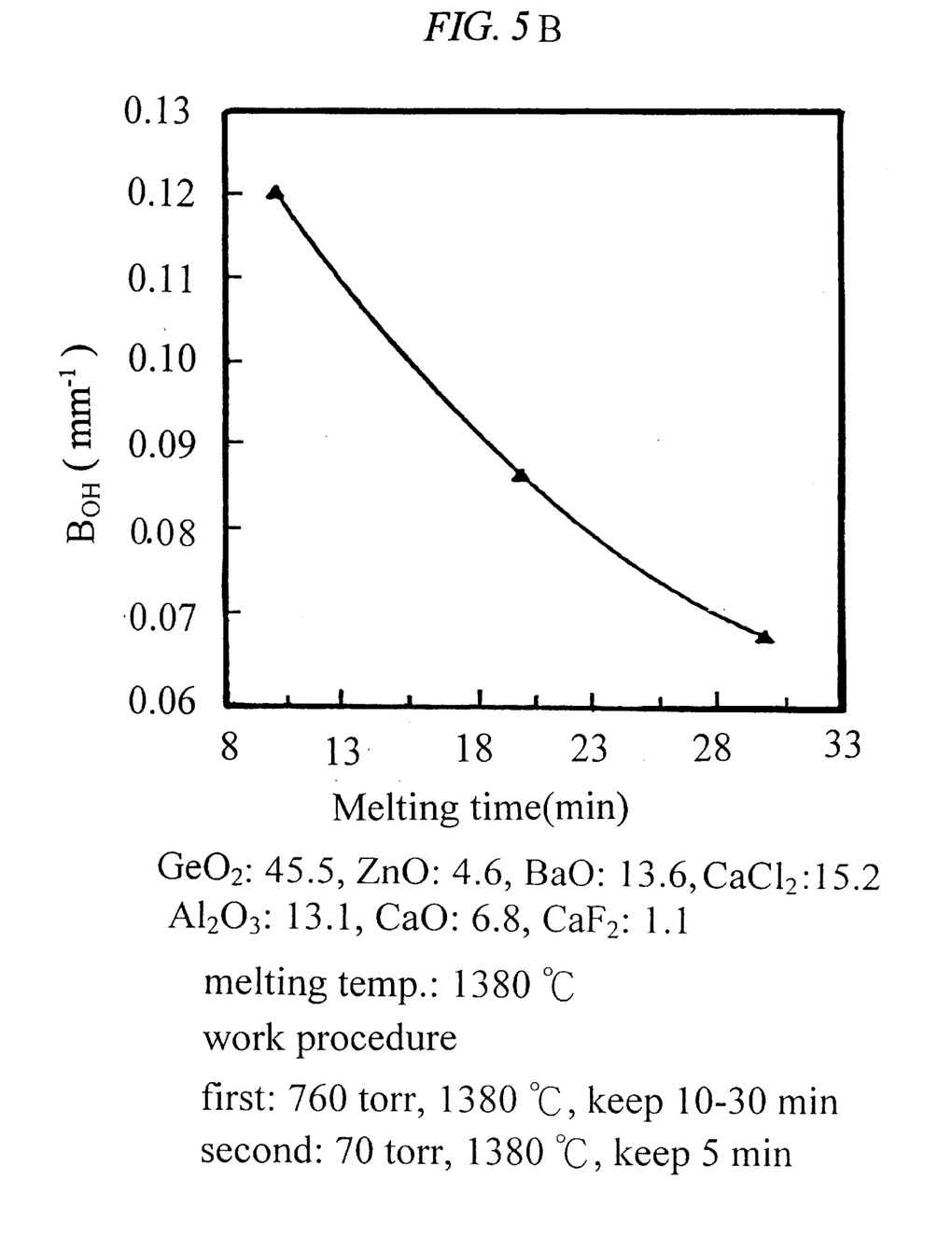
FIG. 5B. The influence of the operating variables vs. the content of the hydroxyl groups in the obtained germanate glass in the present invention.

As FIG. 5-A indicates, the raw materials including $Li_2O$, CaO, BaO, ZnO, $Al_2O_3$ and $GeO_2$ are prepared forming glass compounds in accordance with the specific ratio: 2.0:6.7:7.5:5.1:22.3:54.4, treating the mixture under vacuum at 1420° C., and melting for 90 minutes. The obtained glass body specimen contains the lowest quantity of hydroxyl group, $B_{OH}$, of only 0.12 $mm^{-1}$. Nevertheless, as indicated in FIG. 5-b, the raw material including $CaF_2$, $CaCl_2$, CaO, BaO, ZnO, $Al_2O_3$, and $GeO_2$ is prepared forming glass compounds in accordance with the specific ratio: 1.1:15.2:6.8:13.6:4.6:13.1:45.5. In the meantime, the halide is added into the mixture and treated under vacuum. The treatment process was divided into two stages:

(1). melting the mixture under the condition of 1380° C. and 760 torr and keeping for 30 minutes.

(2). melting the mixture under the condition 1380° C. and 70 torr and keeping for 5 minutes.

Figure 5C:
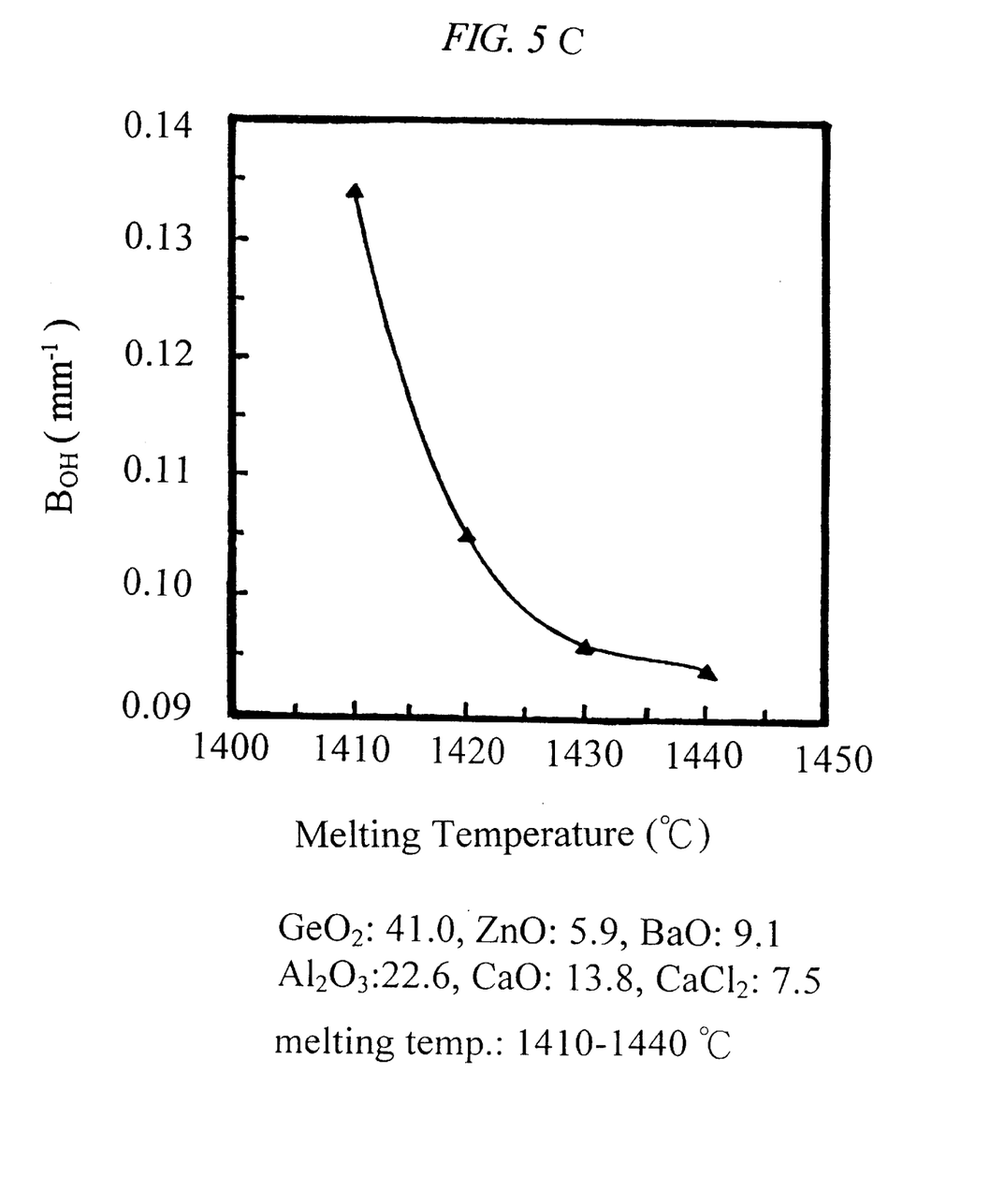
FIG. 5C. The influence of the operating variables vs. the content of the hydroxyl groups in the obtained germanate glass in the present invention.
Figure 5D:
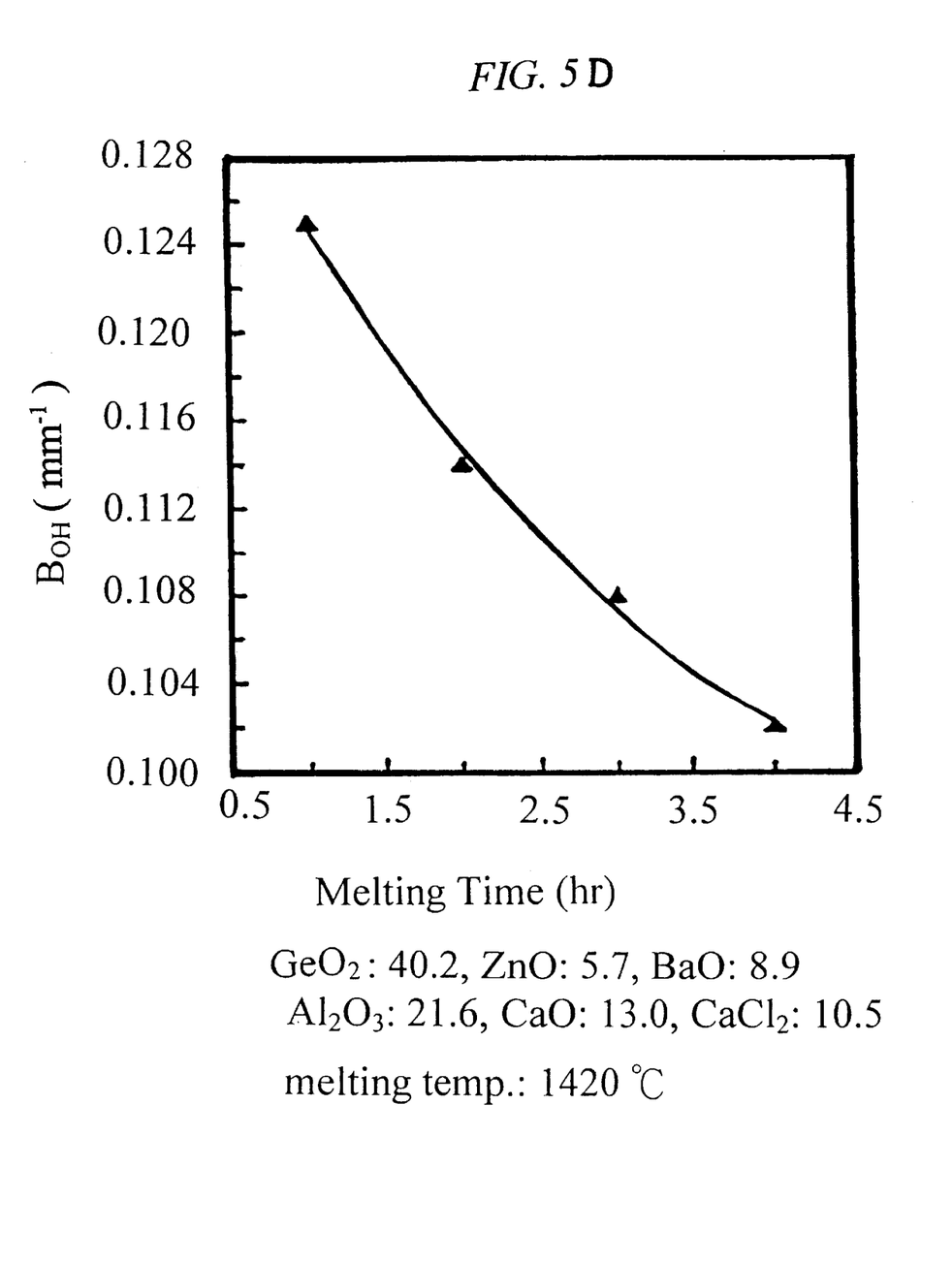
FIG. 5D. The influence of the operating variables vs. the content of the hydroxyl groups in the obtained germanate glass in the present invention.

Herein, the obtained glass specimen contains the lowest quantity of hydroxyl groups, $B_{OH}$, of only 0.068 $mm^{-1}$ only. As indicated in FIG. 5-C, the obtained glass specimen contains the lowest quantity of hydroxyl groups, $B_{OH}$, of only 0.095 $mm^{-1}$. As indicated in FIG. 5-D, the obtained glass specimen contains the lowest quantity of hydroxyl groups, $B_{OH}$ of 0.102 $mm^{-1}$. Therefore, to compare the results as showed above, the result according to the process in this invention is that a lower content of hydroxyl groups can be obtained with an addition of the halide as treating method than with vacuum extraction as a treating method. But, using the addition of halide incorporating the vacuum extraction treatment can obtain the lowest $B_{OH}$.

From all descriptions mentioned above, according to the process in this invention, the obtained germanate glass has the following definite efficacy;

(1). on the equipment side: employing the reducing pressure melting in this invention can cut down on the production of hydrogen halide gas and diminish the corrosion time to 30 seconds due to the low pressure operation and to the decrease in the concentration of hydrogen halide produced from the reaction. Although, the extraction equipment for low vacuum and absorption jar for the hydrogen halide gas abortion needs to be established, the cost of the device will not increase too much.

(2). on the glass body side: On the one hand, using a low pressure treatment can decrease the concentration of water molecules existing in the internal furnace to 0.4 torr and also cause the source of hydroxyl groups to go down, therefore, the opportunity for hydroxyl groups to be mixed into the glass is cut down also. On the other hand, eliminating the blister that exists in the glass is easier under the low pressure state, and the added halide vaporizes easily due to the influence of a low-pressure, high-temperature state. Further, reducing the reaction time of halides and glass raw materials to avoid the excess halides residue occurring improves the germanate glass properties such as hardness and glass transition point.

In the well-known methods for the preparation of germanate glass, the addition of the halide method or the reducing pressure method is employed separately to fabricate the germanate glass; but these products can promote the transmittance of infrared merely from about 10.0% to 40%. According to the process in this invention, the addition of the halides incorporated with the reducing system pressure method obtains the colorless transparent germanate glass. Its infrared transmittance can be increased from 20% to greater than 60% in the region of the wave length of 2.75–3.0 µm. Therefore, the proposed process is more suitable to be used in fabricating the germanate glass than the well-known method and the price of the germanate glass is only half of the CORNING product.

(3). In the process side: the addition of halides can extend the extent that germanate glasses vitrify, lessen the added quantity of $GeO_2$ to about 5–15%, and can effectively reduce cost.

In order to illustrate the purpose, method and special advantages more obviously in this invention, several typical examples are implemented for the illustrations of the process in the present invention. However, the extents of the present invention are not limited by the described examples.

EXAMPLE 1

Using the raw materials, $Li_2O$—CaO—BaO—ZnO—$Al_2O_3$—$GeO_2$ as the major component, a mixture was prepared in accordance with the corresponding ratio, 2.0:6.7:7.5:5.1:22.3:54.4. The system was extracted to a vacuum state using a rotary pump which is a product of ANELVI model YTFO (Japan) with 0.75 KW horsepower. The internal pressure of the melting furnace was changed by adjusting the opening of the extract valve and maintaining the vapor pressure in the range from 1 to 760 torr. The following steps complete the whole process:

(1). heating the furnace temperature up to 1200° C.

(2). depositing the platinum crucible that contains the fully mixed raw materials into the furnace.

(3). heating the furnace temperature up to 1420° C. and keeping the pressure at 70 torr.

(4). ceasing extraction after melting for 90 minutes.

(5). conducting the dry nitrogen gas with 0.5 liter/min. speed into the furnace until the temperature is reduced to ambient.

(6). opening the door of the furnace and taking the crucible out, dumping out the sample to form.

EXAMPLE 2

Using the raw materials, $CaF_2$, $CaCl_2$, CaO, Bao, ZnO, $Al_2O_3$, and $GeO_2$, as the major components, a mixture was prepared in accordance with the corresponding ratio, 1.1:15.2:6.8:13.6:4.6:13.1:45.5. With the similar procedure described in example 1, in the first stage, melting the mixture for 30 minutes at 1380° C. and 760 torr; in the second stage, melting the mixture for 5 minutes at the conditions of 1380° C. and 70 torr.

EXAMPLE 3

Using the raw materials, $CaCl_2$, CaO, BaO, ZnO, $Al_2O_3$, and $GeO_2$, as the major components a mixture is prepared in accordance with the corresponding ratio, 7.5:13.8:9.1:5.9:22.6:41.0. With the similar procedure described in example 1, the mixture was melted with the temperature range from 1410° C. to 1440° C.

EXAMPLE 4

Using the raw materials, $CaCl_2$, CaO, BaO, ZnO, $Al_2O_3$, and $GeO_2$, as the major components a mixture is prepared in accordance with the corresponding ratio, 10.5:13.8:8.9:5.7:21.6:40.2. With the similar procedure described in example 1, the mixture was melted with the temperature range from 1410° C. to 1440° C.

What is claimed it:

1. A germanate glass formed from a composition consisting essentially of the following oxides in the following weight percents:

| Metal Oxide | Weight Percent |
| --- | --- |
| GeO$_2$ | 35–65 |
| Al$_2$O$_3$ | 10–25 |
| ZnO | 3–8 |
| CaO | 5–15 |
| BaO | 6–15 | and at least one alkali metal halide or alkaline earth metal halide, or a mixture of said metal halides, wherein said metal halide is present in said composition in an amount of less than 25 percent by weight.

2. The germanate glass as defined in claim 1 wherein said alkaline earth metal halide is selected from at least one member from the group consisting of calcium chloride, calcium floride, calcium bromide, and calcium iodide.

3. The germanate glass as defined in claim 1 wherein said alkaline earth metal halide is calcium chloride and is present in an amount of about 1–17 percent by weight of said composition.

4. The germanate glass as defined in claim 3 wherein said calcium chloride is present in an amount of about 2–16 percent by weight of said composition.

5. The germanate glass as defined in claim 1 wherein said alkaline earth metal halide is calcium fluoride and is present in an amount less than 3 percent by weight of said composition.

6. The germanate glass as defined in claim 1 wherein said alkaline earth metal halide is calcium fluoride and is present in an amount less than 2 percent by weight of said composition.

7. The germanate glass as defined in claim 1 wherein said alkaline earth metal halide is a mixture of CaF$_2$ and CaCl$_2$, and is present in an amount less than 22 percent by weight of said composition.

8. The germanate glass as defined in claim 1 wherein said alkaline earth metal halide is a mixture of CaF$_2$ and CaCl$_2$, and said CaCl$_2$ is present in an amount of 11–16 percent by weight of said composition and said CaF$_2$ is less than 3 percent by weight of said composition.

9. The germanate glass as defined in claim 1 wherein said oxides are present in the following weight percents:

| Metal Oxide | Weight Percent |
| --- | --- |
| GeO$_2$ | 40–55.5 |
| Al$_2$O$_3$ | 12.5–23 |
| ZnO | 4–6 |
| CaO$_2$ | 6–14 |
| BaO | 7.1–14 |

10. A germanate glass formed from a composition consisting essentially of the following oxides in the following weight percents:

| Metal Oxide | Weight Percent |
| --- | --- |
| GeO$_2$ | 35–65 |
| Al$_2$O$_3$ | 10–25 |
| ZnO | 3–8 |
| CaO | 5–15 |
| BaO | 6–15 |
| Li$_2$O | 0–2 |

11. The germanate glass as defined in claim 9 wherein said oxides are present in the following weight percents:

| Metal Oxide | Weight Percent |
| --- | --- |
| GeO$_2$ | 54.4 |
| Al$_2$O$_3$ | 22.3 |
| ZnO | 5.1 |
| CaO | 6.7 |
| BaO | 7.5 |
| Li$_2$O | 2.0-- |

12. A method for preparing the germanate glass as defined in claim 1 comprising mixing said metal oxides, subjecting said metal oxide mixture to reducing pressure melting, adding said alkali metal halide or alkaline earth metal halide, or said mixture of said metal halides to said melted metal oxide mixture, and drying said melted mixture to form germanate glass.

13. The method for preparing the germanate glass as defined in claim 12, further comprising controlling the internal pressure in a furnace wherein said reducing pressure melting occurs, wherein said reducing pressure melting further comprises reducing pressure in three stages: under fusion, during the reaction of fusion, and after fused.

14. The method for preparing the germanate glass as defined in claim 13, wherein the pressure is from 1 to 740 torr, and said mixture is melted for 20–30 minutes at a temperature of more than 1200° C.

15. The method for preparing the germanate glass as defined in claim 13 wherein said mixture is melted for 30 minutes at 1380° C. and 760 torr and then for 5 minutes at 1380° C. and 70 torr.

16. The method for preparing the germanate glass as defined in claim 12 wherein said drying step comprises an under fusion stage and a during the reaction of fusion stage, wherein said under fusion stage comprises calcining said melted mixture, and preparing said germanate glass in a drying case, wherein oxide is replaced with carbonate in the drying step, and wherein said during the reaction of fusion stage comprises conducting a dried gas into said melted mixture in the presence of a foaming agent, and diffusing hydroxyl groups in said melted mixture.

* * * * *